United States Patent [19]

Dimmick, Sr. et al.

[11] Patent Number: 5,097,216

[45] Date of Patent: Mar. 17, 1992

[54] APPARATUS FOR INSPECTING THE WALL THICKNESS OF A CONTAINER AND CORRESPONDING METHOD

[75] Inventors: Henry M. Dimmick, Sr.; William L. Layton, both of Butler; Lloyd B. Stivison, West Sunbury; Mark F. Zanella, Sr., Zelienople, all of Pa.

[73] Assignee: AGR International, Inc., Butler, Pa.

[21] Appl. No.: 594,737

[22] Filed: Oct. 9, 1990

[51] Int. Cl.$^5$ .............................................. G01R 35/00
[52] U.S. Cl. ..................................... 324/671; 209/522; 324/690
[58] Field of Search ............... 224/671, 662, 686, 687, 224/688, 690; 209/522

[56] References Cited

U.S. PATENT DOCUMENTS

| | | | |
|---|---|---|---|
| 2,616,068 | 10/1952 | McDonald | 324/687 |
| 3,009,101 | 11/1961 | Locher | 324/671 |
| 3,231,815 | 1/1966 | Spencer | 324/690 |
| 3,684,089 | 8/1972 | McMeekin | 324/662 |
| 4,658,254 | 4/1987 | Walton | 324/662 |
| 4,820,972 | 4/1989 | Scott et al. | 324/688 |
| 4,862,062 | 8/1989 | Baker et al. | |
| 4,870,342 | 9/1989 | Scott | |
| 4,888,823 | 12/1989 | Andersen et al. | |
| 4,908,574 | 3/1990 | Rhoades et al. | 324/690 |
| 4,996,658 | 2/1991 | Baker | 324/671 |

Primary Examiner—Kenneth A. Wieder
Assistant Examiner—Maura K. Regan
Attorney, Agent, or Firm—Arnold B. Silverman

[57] ABSTRACT

Apparatus for inspecting the thickness of a container wall, such as a glass or plastic container wall including a plurality of elongated sensors disposed in a linear array in spaced end to end relationship. The containers are urged into intimate contact with the sensor elements and are rotated thereover. The containers are moved from sensing element to sensing element with each element inspecting a portion of the circumference. Oscillators convert the change in capacitance to a corresponding voltage which, in turn, in a processor is converted to an actual thickness reading which is compared with desired predetermined thickness levels. By segmenting the sensors in this manner, a plurality of containers may be inspected simultaneously with a processor combining the individual segments of sensor readings so as to reconstruct the complete thickness evaluation of the container. A corresponding method is provided.

24 Claims, 3 Drawing Sheets

APPARATUS FOR INSPECTING THE WALL THICKNESS OF A CONTAINER AND CORRESPONDING METHOD

BACKGROUND OF THE INVENTION

1. Field of the Invention

The present invention relates to high speed apparatus for measuring the thickness of a container wall employing a plurality of sensor elements which combine to inspect the container and to an associated method.

2. Description of the Prior Art

The importance of inspecting containers, such as glass, or plastic bottles, or jars, in order to make sure that undesired thickness does not result in problems during filling, handling, consumer use, and refilling has long been known. The desired thickness is a function of the material out of which the container is made, the contemplated contents of the container and other factors involved in the handling, filling, use, and refilling of the container.

The variations in thickness can result from such factors as temperature variations in the mold, non-uniform final blow pressure and other process related functions, and also mold seams, i.e., the regions where the two molds used to make the bottle in the forming machine have been joined.

In recent years, new manufacturing techniques have been developed that can produce thinner containers while maintaining the inherent strength of glass containers. As to such containers, it is even more critical that the thickness does not fall below a predetermined desired value.

As to inspections of this type, it is necessary to inspect every container rather than relying on a sampling technique wherein only a selected percentage of the total number of containers are inspected.

It has been known to use changes in capacitance which are subsequently converted to corresponding voltages relating to wall thickness by an oscillator means. See generally U.S. Pat. Nos. 4,820,972; 4,862,062; 4,870,342; and 4,888,824.

In U.S. Pat. No. 4,862,062, there is disclosed a system wherein a number of changes in capacitance are measured about the periphery of the wall of a container as a result of the container being urged into intimate contact with and then rolling along single elongated sensors positioned at three levels. The capacitance is then converted into a voltage which is used to determine wall thickness. The sensors or probes are typically flexible in order to enable the bottle to be urged into intimate contact with the sensor as by a feed screw shown in this patent. Generally similar systems are shown in U.S. Pat. Nos. 4,870,342; 4,820,972; and 4,888,824. One of the difficulties with this type of system is the fact that such inspection devices are relatively slow as the equipment can handle only a single container at a time. The actual throughput speed in containers per minute will vary depending upon the circumferential size of the container. As the speeds of these types of inspection systems, which may be on the order of 100 to 300 bottles per minute, is significantly less than the speed of current bottle forming machines, it is generally necessary to associate two or three such devices with each forming machine in order to effect inspection of all of the containers. This results in additional costs of equipment and associated interconnecting apparatus, such as conveyors, and the need to maintain additional equipment. A modern forming machine may well produce containers, depending on size, at a rate of 500 a minute or more.

It will be appreciated, therefore, that there remains a real and substantial need for a container wall thickness measuring device which is capable of accurately measuring container wall thickness at a high speed.

SUMMARY OF THE INVENTION

The present invention has met the above-described need by providing capacitive sensing means which consist of one or more linear arrays of relatively spaced capacitive sensors. A bottle is translated past the array of sensors while being maintained in intimate contact therewith. In this manner, the sensing array can simultaneously inspect portions of several containers. The individual readings with respect to a given container on the sequential sensors are then combined to provide a thickness reading.

Oscillator means which, in the preferred form, have an inductor secured to the sensor element as distinguished from being connected thereto by a coaxial cable, are provided to convert the changes in capacitance into corresponding voltages. A microprocessor combines the respective readings of the sensor elements on a given container in order to determine thickness and determine if it is in compliance with the desired thickness. Generally, a determination will be made as to whether the minimum thickness has been satisfied. If desired, a determination of maximum thickness and the ratio of minimum to maximum thickness could be made.

If desired, several relatively vertically spaced linear arrays of sensor elements may be employed in order to inspect the circumference of the container at several levels.

An associated method has portions of each container's circumference inspected by different sensor elements in the array.

It is an object of the present invention to provide apparatus for accurate and rapid measurement of container wall thicknesses and to provide an associated method.

It is a further object of this invention to provide such a system which operates with the containers moving at a reduced speed, as compared with present systems, while providing increased speed of container inspection.

It is another object of the invention to provide such a system which will facilitate simultaneous inspection of a plurality of containers.

It is a further object of the present invention to provide an induction element which is closely associated with the sensor element in order to improve accuracy of the reading.

It is a further object of the present invention to provide such a system which may be employed efficiently with existing high speed forming machines.

These and other objects of the invention will be more fully understood from the following description of the invention on reference to the illustrations appended hereto.

DESCRIPTION OF THE PREFERRED EMBODIMENTS

As used herein, the term "container" means a vessel to store a product and includes, but is not limited to containers that are suitable for food and beverages as sold at retail, or of larger sizes as sold to restaurants and food suppliers, and shall expressly include, but not be limited to glass or plastic bottles and jars.

Figure 1:
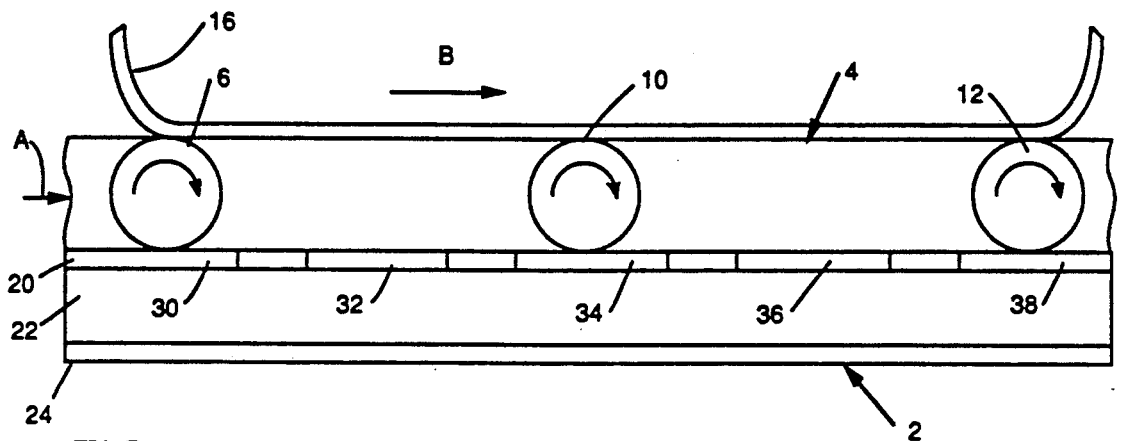
FIG. 1 is a schematic plan view of a portion of a form of apparatus of the present invention.

Referring more specifically to FIG. 1 there is shown the stationary capacitive sensor means 2 and adjacent conveyor 4 which moves in the direction indicated by the arrow A. An endless belt 16, which moves in the direction of arrow B, urges the containers 6, 10, 12 into intimate contact with the sensor means 2. The containers 6, 10, 12 are being translated in the direction indicated by arrow A and are being subjected to axial rotation in the direction indicated on the containers 6, 10, 12, thereby progressively providing intimate surface-to-surface contact between the sensor means 2 and a portion of the container.

The sensor means 2, in the form illustrated, has a capacitive sensing strip 20 in contact with the containers 6, 10, 12, a resiliently compressible material 22 which is secured to the sensor strip 20, and a rearwardly positioned substantially rigid support 24 to which the resiliently compressible material 22 is secured. It will be appreciated that in this manner, the containers 6, 10, 12 will be urged into intimate contact with the sensor means 2 by belt means 16 with the intimacy of the contact being enhanced as a result of the resilient backing material 22.

Figure 2:
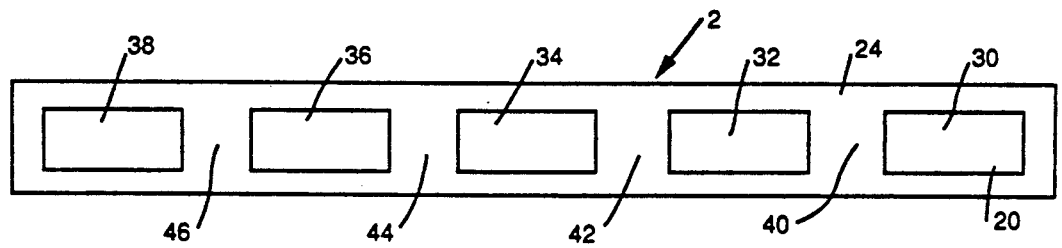
FIG. 2 is a front elevational view of a type of sensor of the present invention.

Referring to FIGS. 1 and 2, a specific feature of the invention will be considered. The sensor means 2 consists of a plurality of sensor elements 30, 32, 34, 36, 38 each of which is independently connected to oscillator means which will convert the change in capacitance output of the sensor element 30, 32, 34, 36, 38 to a corresponding voltage which, in turn, is converted by means of a computer into corresponding thicknesses. The sensor elements 30, 32, 34, 36, 38 are all preferably of the same size and shape and are aligned with each other and are disposed in a linear array. In the form shown, the array consists of five sensor elements, although less or more could be employed if desired. It is generally preferred to use about three to five such sensor elements in the array.

It will be appreciated that as is shown in FIG. 1, three containers, 6, 10, 12 are being inspected simultaneously as contrasted with prior art systems of this general type wherein only a single container could be inspected at one time. So as to maintain the independence of the discrete sensor elements, and the data obtained therefrom, appropriate gaps are provided therebetween. For example, as shown in FIGS. 1 and 2, a gap 40 is disposed between sensor elements 30 and 32 and gaps 42, 44 and 46, respectively separate 32-34, 34-36, and 36-38. These gaps need be present only in the sensing strip pattern. It is preferred that these gaps be about 1/32" to 5/32" inch in order to effectively avoid undesired spillover from one sensor to another, while not being so large as to interfere with efficiency of operation of the inspection system.

A presently preferred sensing strip pattern is created by applying a pattern of silver paint to a strip of plastic material in order to form a capacitor. The inner rectangular area of one pattern such as 30, for example, is one plate of the capacitor which is separated from the other plate consisting of the balance of the strip. The total capacitance of the sensor strip 20 is a function of the dielectric constant of the plastic material and the pattern dimensions. The capacitance is increased by any material placed in the fringing field in front of the sensor strip 20. When glass, for example, is placed against the sensor strip 20, the increase in capacitance is a function of (a) the thickness of the glass, (b) the dielectric constant of the glass, and (c) the distance between the face of the sensor strip 20 and the glass. As the dielectric constant does not vary and the distance is controlled, the capacitance change becomes a function of the glass thickness. The sensor strip 20 may have a capacitance of 6 pf., for example.

The sensing strip 20 material may preferably be selected from the group consisting of polypropylene and polycarbonate such as that offered under the trade designation Lexan by General Electric. The resilient backup material 22 may preferably be urethane foam and the substantially rigid support 24 may be composed of metal, such as steel. The support 24 will be secured to an appropriate supporting member in a manner well known to those skilled in the art by any suitable means.

As will be further appreciated from the disclosure which follows, in operation, container 12 would initially be rotating and have a portion of its circumference at a given elevation in contact with sensor element 30. It would then proceed to rotate over sensor elements 32, 34, 36, 38 with the net result being that the total circumference of the container at a particular elevational band at which elements 30, 32, 34, 36, 38 are present will have been inspected. The present invention, however, offers the advantage that rather than having solely container 12 be inspected during its period of travel on conveyor 4 by the sensor means 2, in addition, containers 6 and 10 have proceeded in proper indexed fashion immediately therebehind.

In the preferred form shown in FIG. 1 of the invention, containers 6, 10, and 12 are positioned respectively in contact with sensor elements 30, 34 and 38. The intermediate elements 32, 36 are left without containers contacting them. By leaving an unused sensor element between each pair of containers, the effective use of crossover data in a manner which will be discussed hereinafter is facilitated.

Figure 3:
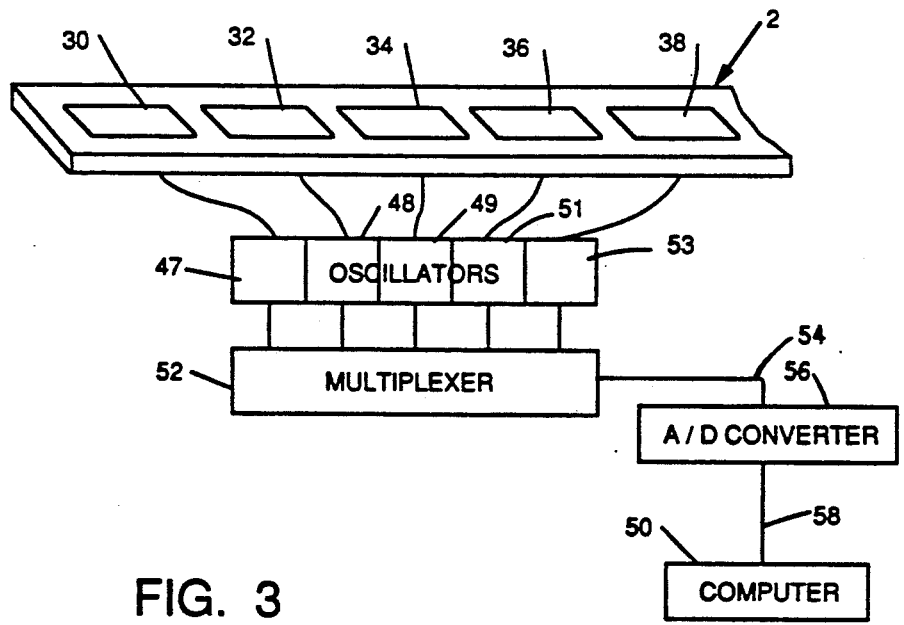
FIG. 3 is a schematic illustration of the electronic and sensing components of the invention.
Figure 4:
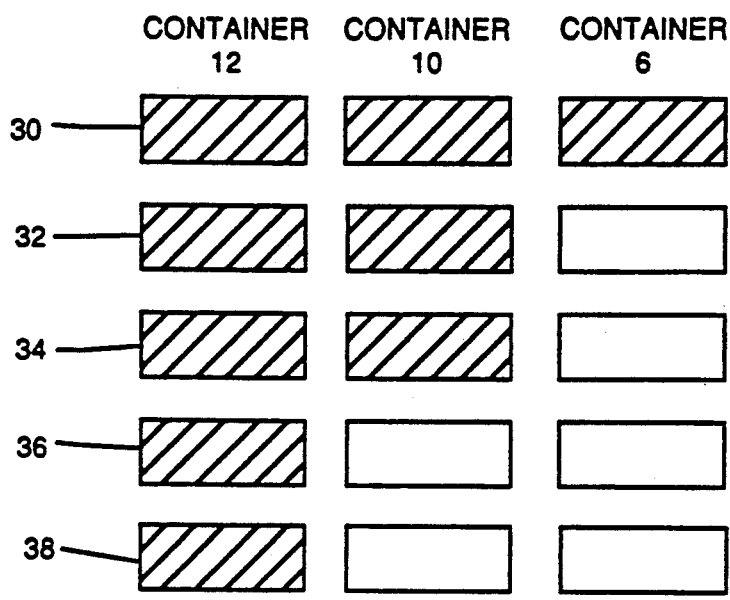
FIG. 4 is a schematic representation of computer storage of container inspection sequences.

Referring to FIGS. 3 and 4, the manner in which this information is processed will be considered in greater detail. The output of sensor elements 30, 32, 34, 36, 38 goes respectively to oscillators 40, 42, 44, 46, 48 which convert the change in capacitance into a corresponding voltage signal. While a single oscillator with a multiplexer concept causing each sensor element to be scanned sequentially may be employed, if desired, it is presently not the preferred approach. Electric processor means which may take the form of any suitable computer receives the voltage output from oscillators 47, 48, 49, 51, 53 through multiplexer 52 and is converted to a digital signal by analog-to-digital converter 56 which is received by the computer over lead 58.

The computer 50, which may be programmed in any manner well known to those skilled in the art to accomplish the objectives, merely needs to receive and store the output of each signal element in a manner coordinated with the particular container which is being sensed. Referring to FIG. 4, for example, as shown in container 12 at the completion of its cycle will have been exposed to sensors 30, 32, 34, 36, 38 with the solid rectangles indicating the computer has five discrete elements of data which represent thickness sensing over a circumferential band at a particular elevation, i.e, the elevation at which the sensor means 2 is located for at least a full circumference of turning of the container. Combining these five blocks will give full data on the thickness of the container wall within that band. Similarly, at the end of the current cycle of inspection container 10 will have been exposed to sensors 30, 32, and 34 providing three blocks of data. Container 6 has been exposed to solely sensor 30. It will be appreciated that in this manner, three containers are being inspected for wall thickness simultaneously.

Figure 5:
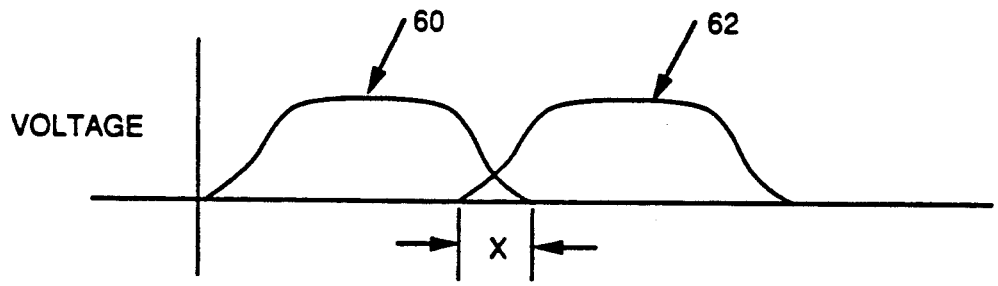
FIG. 5 is a plot of voltage versus time showing the output of two adjacent sensor elements.

As indicated previously, in order to use a plurality of sensor elements in an array in this manner, a gap which preferably is about 1/32" to 5/32" inches is provided between adjacent sensor elements. The gap should be carefully selected so as to provide maximum efficiency of operation of the system. As shown in the plot of voltage versus time shown in FIG. 5, a first curve which has been designated 60 has a build-up period, a generally horizontal voltage period, and then a reduction period. A similar contour exists with respect to curve 62 which may be considered as representing two adjacent elements such as sensor elements 30, 32, for example. The period of solid contact between a bottle circumference and a single sensing element is the portion of each curve 60, 62 represented by the general horizontal sector. The period X between curve 60, 62 indicates generally the crossover area between the period when the bottle leaves one sensor element and enters another. Knowing the crossover period and gap, one may program the microprocessor 50 so as to take into consideration this period of travel of the container when computing thickness. It is known that when the bottle is completely on one of the segments, such as in the horizontal portion of curve 60, 62, the signal is proportional to the thickness of the container wall. Calibration of the relationship between a given voltage reading which is derived from a change in capacitance and the corresponding dimension is readily achieved by measuring standard known glass or plastic thicknesses. As the dielectric coefficient of glass is different from that of plastic, different coefficients are employed for different materials. The principle which underlies this system is the fact that the dielectric constant of either of the materials is substantially different from that of a free air gap. This enables the change in capacitance to be correlated accurately with wall thickness.

When the bottle is in the crossover area, information from two sensors are received. One approach to solving this problem would be to choose the gap size and sensor element configurations so that the sum of the signals of the two segments during the crossover time would provide a straight line if the container is of uniform wall thickness. Another approach to handling the crossover situation would be to measure a standard thickness by rolling it from one sensor element to another and use this as a reference in measuring the unknown container being inspected. A further approach would be to characterize mathematically the curvature in the crossover area and use this as a reference for basis of comparison.

Figure 6A:
FIG. 6(a) and 6(b) show two forms of sensor elements.

Referring to FIG. 6(a) there is shown respectively a pair of sensor elements 70, 72 which are generally rectangular in configuration and having a gap therebetween. The sensor elements 70, 72 will generally be of equal size, except that the first and last sensor in a sensor array, if desired, may be longer than the others as there would be no crossover data at the entry and exit ends of the array. In a typical installation, the sensor elements 70, 72 may have a length of about 2½" to 3½" inches, a height of about ¼" to ½" inch, and a gap of about 1/32" to 5/32" inch.

In FIG. 6(a) the sensor elements have a generally rectangular configuration.

A larger gap will cause the voltage signal from the sensor element to drop earlier.

Figure 6B:
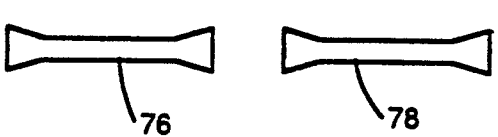

In the embodiment shown in FIGS. 6(b), the sensor element 76, 78 have flared ends. This serves to alter the curved portion of the curve for a given gap size increasing the rate of dropping of the curve.

Figure 7:
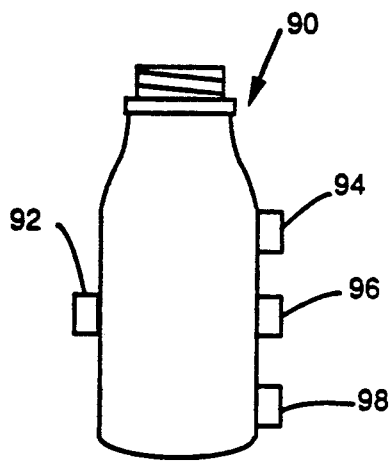
FIG. 7 shows a container in contact with three arrays of sensor elements.

Referring to FIG. 7, a further feature of the invention will be considered. It will be appreciated that the invention is not limited to the use of a single elongated array of sensor elements, but rather a plurality of relatively vertically spaced arrays may be used in order to monitor thickness at several different levels of the container about the circumference thereof. As shown in FIG. 7, a bottle 90 is urged into intimate contact with the sensor means by drive belt 92. In this form, the sensor means consists of three linear arrays 94, 96, 98 each containing a plurality of sensor elements. The arrays are preferably generally parallel to each other and each maintained in intimate contact with the container 90, which in the form shown is a bottle.

In such a system, the computer will receive outputs from the individual oscillators by a multiplexer and analog to digital converter (not shown) and will provide information regarding the thickness at three elevations.

In the event that the thickness does not meet the minimum standard or other standards programmed into the computer, appropriate means well known to those skilled in the art may be provided to enable an output signal from the microprocessor or computer 50 to activate a reject mechanism which will remove the unsatisfactory container from the transfer means downstream of the inspection station.

Figure 8:
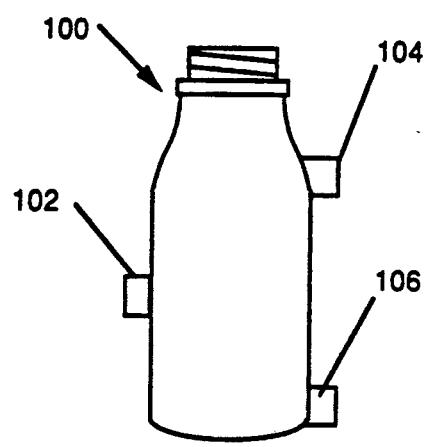
FIG. 8 shows a container in contact with uniquely configured sensor elements.
Figure 9:
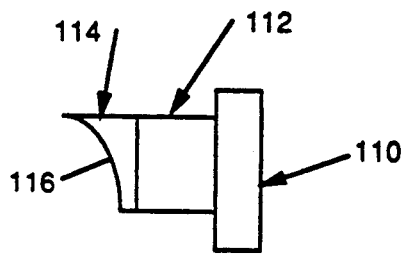
FIG. 9 is a cross-sectional illustration of a form of sensor element of FIG. 8.

Referring to FIG. 8, there is shown a container 100 which is being maintained in the desired inspection position by a drive belt 102 and a linear pair of sensor arrays 104, 106 each consisting of a plurality of sensor elements. In these embodiments, the sensor elements, rather than having a generally flat surfaces which will be resiliently urged into contact with a cylindrical surface of the container, have a non-planar surface which is generally of complimentary configuration to the portion of the container with which they will be in contact. A sensor of the type shown at 104 in FIG. 8 is shown in FIG. 9 wherein a substantially rigid back-up member 110 is secured to a resiliently compressible material 112 which, in turn, is secured to the sensor element 114 which has a front face 116 which is generally concave and of complimentary configuration to the container portion.

The capacitance sensor system of the present invention measures container thickness by monitoring the effects of capacitance change on the frequency of an oscillator circuit. The oscillator circuits typically may have two frequency determining components, one of which is the capacitance represented by the sensor element, and the other is the inductance which is provided by an inductor of a fixed value. These two elements combine to form a tank circuit whose natural resonant frequency is determined by the value of the components. It is important that the mass of the sensor assembly be kept as low as possible in order that the compliance at the sensor strip which permits intimate contact with the container is not compromised. This is generally accomplished by having the oscillator electronics separate from the sensor assembly. Prior art systems have utilized a coaxial cable which connects the capacitive element of the sensor with the inductive element of the tank circuit. The inductive element typically resided in the external assembly with the rest of the oscillator of electronics. As the capacitance being measured is very small and may be of the order of thousandths of a picofarad per mil of glass range, this arrangement causes the coaxial cable to become a critical component as its capacitive and inductive properties are effectively part of the tank circuit. As a result, any movements or microphonic tendencies of the cable can have a detrimental effect on the accuracy of the measurements.

Figure 10:
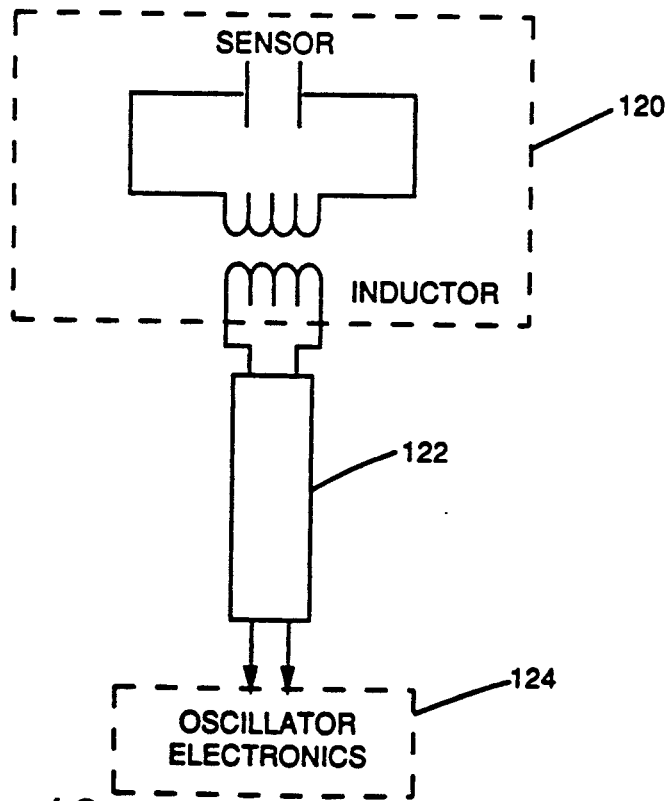
FIG. 10 is a schematic diagram of a preferred circuit of the present invention.

In the present invention, the preferred tank circuit as is shown in FIG. 10, is modified by mounting the inductive element directly on the sensor element. This is generally indicated by reference number 120 in FIG. 10.

In one embodiment, a secondary winding is wrapped around the outside of an encapsulated inductor to couple the signal through transformer action between the windings. The inductor is mounted within an enclosure and positioned within a recess in the resiliently compressible material 22. The unit is then electrically connected to a sensor element and to a coaxial cable which, in turn, is connected to the oscillator electronics.

The inductor is such that it has no detrimental effect on the flexibility and reliability of the sensor element. The coaxial cable 122 which couples the inductor to the remainder of the oscillator electronics 124 then becomes a low-impedance interconnect to the rest of the electronics 124. This eliminates the need for critically calibrated cables and makes the circuit immune to problems of movement and tolerances of the cable.

The method of the present invention employs the features of the foregoing system. It sequentially moves a container to be inspected translationally through the region of the sensors and rotationally in intimate contact thereover without slippage so as to have each sensor element in a linear sensor array inspect a circumferential portion of the container wall thickness and to have the oscillator convert the readings into corresponding voltages with the computer combining the individual readings for the container into a thickness determination for the entire circumference of that elevational portion of the container which has been inspected.

The linear sensor array of the present invention may, for example, have two or more, and preferably four to five individual sensor elements and may have an overall length of about 18" to 23" inches.

A single inspection line of this type may inspect on the order of about 400 to 500 bottles per minute. It will be appreciated that this permits the bottles to be inspected to be relatively close to each other rather than requiring the large relative spacing of the prior art. This allows the speed of the drive belt transporting the bottles to the inspection zone to be reduced significantly and simplifies the slow down mechanism employed for bottles emerging from the inspection station, as well as reducing wear and tear thereon.

In general, each sensor will inspect a vertical band along the circumference of the container which band is about $\frac{1}{4}$" to $\frac{1}{2}$" inch high.

It will be appreciated, therefore, that the present invention provides an effective means for simultaneously inspecting a plurality of containers by a single sensor means which contains at least one linear array of sensor elements. This is done at a rapid and accurate manner so as to facilitate economic adoption and use of such a system which will be compatible with modern high speed container forming machines.

While for purposes of illustration containers of certain configuration, as well as sensor elements of certain configuration have been disclosed for convenience and clarity of disclosure, it will be appreciated by those skilled in the art that the invention is adapted for use with numerous types of containers of various shapes and that variations in the shapes of the sensor means and sensor elements, as well as sizes thereof may be made while remaining within the confines of the present invention.

Whereas particular embodiments of the invention have been described above for purposes of illustration, it will be evident to those skilled in the art that numerous variations of the details may be made without departing from the invention as defined in the appended claims.

We claim:

1. Apparatus for inspecting the thickness of a container wall comprising,
    elongated capacitive sensor means having a plurality of sensor elements disposed in relatively spaced end to end relationship,
    means for urging said containers into intimate rotational contact with said sensor elements,
    means for effecting translational movement of said containers between said sensor means and said container urging means,
    oscillator means operatively associated with said sensor means to receive thickness information in the form of changes in capacitance and for generating corresponding voltage signals,
    electronic processor means for receiving said voltage signals and comparing them with desired thickness values in determining whether the desired thickness is present, and
    said oscillator means having means for receiving said thickness information from at least two said sensor elements for each container inspected, whereby said apparatus can inspect a plurality of containers simultaneously while sequentially inspecting different portions of the circumference of each said container by means of different said sensor elements.

2. The inspection apparatus of claim 1 including,
    said apparatus having at least three said sensor elements, and said oscillating means having means to receive said thickness information from a plurality of said sensor elements for each said container inspected.

3. The inspection apparatus of claim 2 including,
said apparatus being calibrated to inspect a container selected from the group consisting of glass containers and plastic containers.

4. The inspection apparatus of claim 2 including,
inductor means secured to and operatively associated with said sensor means, and
cable means connecting said inductor means to the remainder of said oscillator means.

5. The inspection apparatus of claim 4 including,
said inductor means having a plurality of inductor units each having a primary coil and a secondary coil wrapped in generally surrounding relationship to said primary coil and being inductively coupled thereto.

6. The inspection apparatus of claim 5 including,
said inductor units each being disposed within a housing and being disposed adjacent to a said sensor element to which it is coupled.

7. The inspection apparatus of claim 2 including,
said sensor elements having a capacitive sensing strip, a resiliently compressible material disposed rearwardly and secured to said sensing strip, and a substantially rigid support to which said resiliently compressible material is secured.

8. The inspection apparatus of claim 2 including,
said plurality of sensor elements being a first sensor array, and
a second sensor array disposed in spaced generally overlying relationship with respect to said first sensor array, whereby said apparatus will inspect said container at portions disposed at different elevations.

9. The inspection apparatus of claim 8 including,
at least one additional sensor array disposed in spaced generally overlying relationship with respect to said first and second sensor arrays.

10. The inspection apparatus of claim 9 including,
at least one of said sensor arrays having sensors of a different cross-sectional shape from the sensor elements of at least one other said sensor array.

11. The inspection apparatus of claim 10 including,
one said array having generally concave shaped sensors.

12. The inspection apparatus of claim 2 including,
said means for effecting container movement having means for simultaneously establishing contact between each of a plurality of containers and a corresponding said sensor element.

13. The inspection apparatus of claim 12 including,
said means for effecting container movement having means for sequentially moving each said container into contact with each said sensor element.

14. The inspection apparatus of claim 1 including,
said processor means having means for combining the oscillator output signals for a said container from each said sensor element inspecting said container.

15. The inspection apparatus of claim 14 including,
said oscillator means having separate oscillator circuits for each said sensor element.

16. The inspection apparatus of claim 14 including,
said oscillator means including multiplexer means for sequentially receiving information from each said sensor element.

17. The inspection apparatus of claim 16 including,
the aggregate length of the active portion of said sensor elements in a said sensor array being at least as long as the circumference of said container to be inspected.

18. The inspection apparatus of claim 1 including,
the gap between adjacent said sensor elements being about 1/32" to 5/32" inch.

19. A method of inspecting container wall thicknesses comprising,
providing capacitive sensor means having a linear array of sensor elements for emitting a signal correspondent to changes in capacitance oscillator means for converting said signals to corresponding voltage signals and electronic processor means for comparing said voltage signals with a predetermined desired thickness,
simultaneously inspecting a plurality of said containers while sequentially moving a said container into intimate contact with said sensor elements and inspecting only a portion of the circumference of each said container by a said sensor element,
converting said capacitive changes from variations in said container thickness from each said sensor element into corresponding voltage signals,
combining said voltage signals corresponding to a said container into a corresponding thickness value, and
comparing said thickness measurements with the desired thickness, whereby said apparatus can inspect a plurality of containers simultaneously while sequentially inspecting different portions of the circumference of each said container by means of different said sensor elements.

20. The method of claim 19 including,
simultaneously inspecting a plurality of containers each in contact with one said sensor element, and
subsequently moving the containers at each said sensor element except the last sensor element to the next succeeding sensor element for further inspection.

21. The method of claim 20 including,
providing a plurality of generally vertically spaced sensor element arrays, and
simultaneously at each said sensor element station inspecting wall thickness at two or more vertically spaced sections of the container.

22. The method of claim 21 including,
during inspection of a said container effecting rolling of the container over a sensor element while maintaining intimacy of contact therebetween.

23. The method of claim 22 including,
providing the sensor elements of such length that in the aggregate they are at least equal to the circumference of the portion of the container which the sensor elements will be inspecting.

24. The method of claim 20 including,
during said inspection maintaining a sensor element without container contact between two sensor elements having containers in contact therewith.

* * * * *